(No Model.)
C. STENGEL.
CASTER.
No. 265,642.
Patented Oct. 10, 1882.
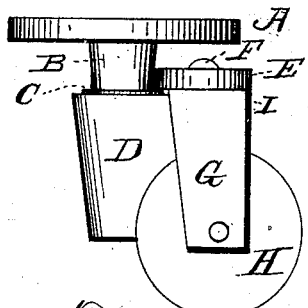
Fig. 1.
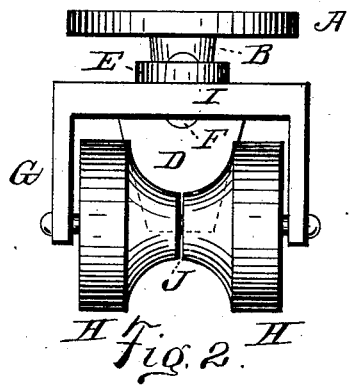
Fig. 2.
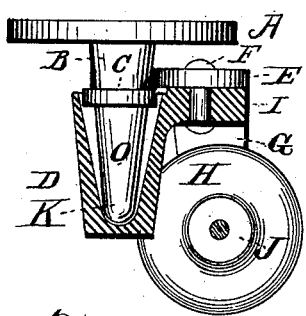
Fig. 3.
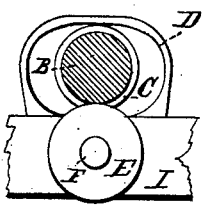
Fig. 6.
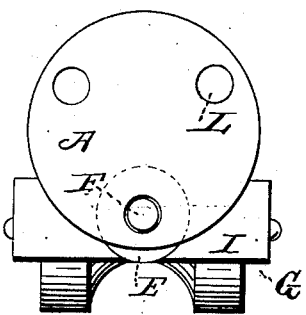
Fig. 4.
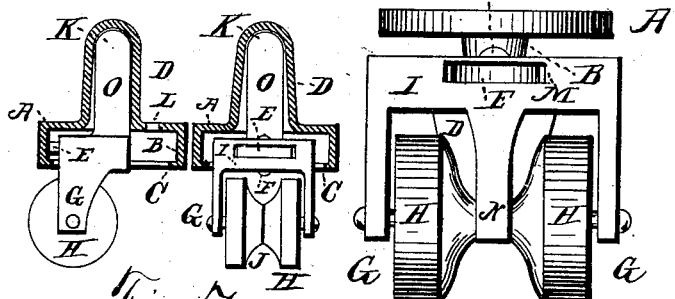
Fig. 7.
Fig. 5.
WITNESSES:
John Lorenz
Charles W Finlay
Charles Stengel INVENTOR
by James W. See
ATTORNEY
N. PETERS. Photo-Lithographer, Washington, D. C.

UNITED STATES PATENT OFFICE.

CHARLES STENGEL, OF HAMILTON, OHIO.

CASTER.

SPECIFICATION forming part of Letters Patent No. 265,642, dated October 10, 1882.

Application filed July 18, 1882. (No model.)

*To all whom it may concern:*

Be it known that I, CHARLES STENGEL, of Hamilton, Butler county, Ohio, have invented certain new and useful Improvements in Casters, of which the following is a specification.

In the accompanying drawings, Figure 1 is a side view of my improved caster; Fig. 2, a front view; Fig. 3, a side view, part in vertical section; Fig. 4, a plan; Fig. 5, a front view with the construction somewhat modified; Fig. 6, a section plan; and Fig. 7, vertical sections of the caster adapted by a modification of construction for stem attachment to furniture.

The invention, as hereinafter set forth and claimed, is adapted by a reasonable exercise of constructive skill for use in furniture-caster designed to be attached to furniture by a screwed plate, by a spindle fitting into a socket, and by the other plans commonly followed in attaching casters to furniture.

The drawings exhibit what is known to the trade as a "plate-caster."

The invention pertains to the means for attaching the housing to the part which is attached to the furniture, to the means for relieving the friction of swiveling, and to the means for relieving the friction of oscillation when two floor-wheels are used, the invention being applicable to single-wheeled or double-wheeled casters.

In Figs. 1, 2, 3, 4, and 5, A is the plate, having holes L for screws to attach it to the furniture. O is a spherical-ended stem, pendent from plate A, and having shoulder C. I G is the horned housing, carrying on an axle the two wheels H H, whose inner hubs abut at J. D is a cup attached to and forming a part of the housing. The spindle or stem O has a step-bearing in the bottom of this cup. E is a wheel, with its axis vertical, journaled upon a rivet, F, in the top of the housing. This wheel bears with its periphery upon the upper portion, B, of the stem O. The rivet F, in constructing the caster, may be inserted through one of the holes L in the plate. The cavity of the cup D is of such size at the top as to permit the usual amount of oscillation of the housing upon the stem.

In my caster the wheel E, engaging above the shoulder C upon the part which is attached to the furniture, serves to unite the housing to the said part, which is attached to the furniture without other rivets or screws, thus permitting the bottom of the cup D to be closed and oil-tight to retain the lubricant applied to the stem.

The wheel E, while I utilize it as an anti-friction wheel, may serve simply as a clamp riveted to the housing and engaging above the shoulder C to unite the parts. If so used, it would hardly be termed a "wheel," and need not necessarily be round, any form to engage as this wheel E engages over the shoulder C upon the piece which is attached to the furniture being suitable.

In Fig. 5 the wheel E is shown as seated in a mortise, M, in the housing. This yields a structure of somewhat greater strength than that shown in Fig. 2, but requires coring in manufacture. The rivet F in this case need have no lower head. It may be dropped into place, and the wheel will be prevented from rising by the metal above the mortise. While the method of journaling the wheel E shown in Fig. 2 is the simpler and cheaper, I explain Fig. 5 as the best mode in which I contemplate applying the principle of my invention.

In Fig. 7, I show the best mode in which I contemplate applying the principle of my invention to articles which permit a large hole in the legs. In this case the step-bearing K is up in the furniture-leg and the shoulder C is internal. The wheel E engages with the shoulder and unites the parts, as above mentioned.

I claim as my invention—

1. The combination, in a caster, of the following elements, viz: the piece adapted to be attached to the furniture and having an annular shoulder, and the floor-wheel housing, the one part swiveling upon the other, with the wheel journaled at the top of said housing and having its axis vertical, and said wheel arranged to engage said annular shoulder with its under side, substantially as described.

2. In a caster, the combination, substantially as set forth, with a piece adapted to be attached to furniture and having a step-ended pendent stem with an annular shoulder, one or more floor-wheels journaled in the housing, and a horizontally-moving wheel journaled to the housing and engaging upon the upper surface of said shoulder, of a housing having a deep closed-bottomed cup surrounding said stem.

CHARLES STENGEL.

Witnesses:
J. W. SEE,
JOHN LORENZ.